United States Patent [19]
Garner et al.

[11] 4,182,259
[45] Jan. 8, 1980

[54] APPARATUS FOR MEASURING COATING THICKNESS ON AN APPLICATOR ROLL

[75] Inventors: Joseph L. Garner, Sanford; Edwin L. Wittbrodt, Auburn, both of Mich.

[73] Assignee: The Dow Chemical Company, Midland, Mich.

[21] Appl. No.: 948,468

[22] Filed: Oct. 4, 1978

[51] Int. Cl.² .................. B05C 1/08; B05C 11/10; H01J 39/12; G01N 21/28
[52] U.S. Cl. .................................. 118/712; 250/577; 356/381
[58] Field of Search .......... 118/7, 8, 9; 427/10; 356/381, 375, 384, 385; 250/573, 575, 577, 560, 561

[56] References Cited
U.S. PATENT DOCUMENTS

| | | | |
|---|---|---|---|
| 2,371,259 | 3/1945 | Patterson | 250/573 X |
| 2,951,416 | 9/1960 | Shinn | 118/9 X |
| 2,971,461 | 2/1961 | Bradford et al. | 118/9 X |
| 3,130,303 | 4/1964 | Dobbins | 118/9 |
| 3,190,261 | 6/1965 | Ziffer | 118/8 |
| 3,330,961 | 7/1967 | Juengst et al. | 118/8 X |
| 3,378,676 | 4/1968 | Clement | 118/8 X |
| 3,809,907 | 5/1974 | Schuller et al. | 356/381 X |
| 3,844,870 | 10/1974 | Donoghue et al. | 118/8 X |
| 4,030,836 | 6/1977 | Smith | 356/381 X |
| 4,035,635 | 7/1977 | Crosland et al. | 250/577 X |

Primary Examiner—Morris Kaplan

[57] ABSTRACT

An apparatus and method are disclosed for measuring the amounts of a coating material on an applicator roll. A beam of light is projected so that only a first portion thereof is intercepted by the coating material on the applicator roll. At least a fraction of the remaining light portion passes through an aperture defined by a slotted shield member and the coated roll surface, said fraction varying with the thickness of said material on the roll surface, and detector means disposed to measure said variable fraction.

15 Claims, 7 Drawing Figures

APPARATUS FOR MEASURING COATING THICKNESS ON AN APPLICATOR ROLL

BACKGROUND OF THE INVENTION

The present invention relates to an apparatus for determining the amount of a coating material on a cylindrical surface.

In the production of many coated articles such as carpeting and paper, the coating composition, e.g., binder or sizing, is applied to the article's surface by the continuous transfer of said composition thereto from an applicator roll. Typically, in such application, the applicator roll rotates in a reservoir of the coating composition and applies the liquid film of the composition formed thereon to the article's surface, either directly or through a series of additional rolls.

In such operations, in order to effectively coat the article, i.e., impart thereto the desired physical properties such as printability to printed paper and dimensional stability and rigidity to a carpet structure, it is generally desirable to measure the amount of the coating composition on the applicator roll.

Heretofore, several apparatuses and methods have been proposed for determining the amounts of the coating composition on an applicator roll. For example, U.S. Pat. No. 2,951,416 discloses an apparatus useful for measuring the thickness of a liquid film on a moving member which comprises a film pick-up roll of a light transmitting material in peripheral engagement with the moving member, a light source for projecting light through the roll and a photoelectric means for measuring the light transmissibility therethrough. Unfortunately, such apparatus requires a substantial capital outlay. Moreover, due to the large amounts of highly reflective fillers, e.g., calcium carbonate, in many latex-based coating systems, this apparatus cannot be employed in conventional coating applications involving such composition.

Similarly, the amount of ink on a printing cylinder may be controlled by an apparatus comprised of (1) a radiation emitting means carried by the cylinder and adapted to pass radiation through a coating of ink thereon and (2) a radiation response means to measure the amounts of radiation transmitted by the coating. See, for example, U.S. Pat. No. 2,971,461. U.S. Pat. No. 3,130,303 discloses a similar type apparatus employing beta ray backscattering as a means of measuring the coating thickness on a roll. Unfortunately, such methods and apparatuses require substantial capital expenditure and cannot be suitably employed in many production operations.

Also known are several methods and apparatuses which control the amounts of a coating composition transferred from an applicator roll to a continuously moving web or strip of material, thereby indirectly measuring the amount of the coating material on the applicator roll. See, for example, U.S. Pat. Nos. 3,605,682 and 2,981,638. While these methods and apparatuses accurately measure and control the average amount of said composition transferred from the applicator roll over an extended period of time, they cannot effectively measure or control momentary deviations from the average.

In view of the aforementioned deficiencies of prior art methods and apparatuses, it remains highly desirable to provide an effective and economical apparatus and method for determining the amount of a coating material on a cylindrical surface, which apparatus can detect instantaneous changes in such amount.

SUMMARY OF THE INVENTION

Accordingly, the present invention is such an apparatus for determining the amount of a coating material on a cylindrical surface. The apparatus of this invention comprises (1) a cylindrical surface for receiving the coating material, (2) a light source which is capable of emitting a beam of light in a direction which is not parallel to the axis of the cylindrical surface, the light source being positioned such that when the coating material is deposited on the cylindrical surface, a first portion of the light emitted therefrom is intercepted by the coating material deposited on the cylindrical surface and a second portion passes across the arc of the coated cylindrical surface and (3) a detector means which measures the amount of at least a fraction of th amount of light which traverses the space between the light source and the detector, i.e., the second portion of light. This fraction varies with the thickness of the coating material when said coating material is deposited on the cylindrical surface.

The apparatus of the present invention comprises means (1) emitting a beam of light in a direction which is not parallel to the axis of the cylindrical surface and in a manner such that a first portion of said light is intercepted by the coating material on the cylindrical surface and a second portion passes across the arc of the coated cylindrical surface and (2) measuring at least a fraction of the amount of the second portion of light.

In a preferred embodiment, an adjustable shield is spaced apart from the cylindrical surface at a known distance from a tangent line formed between a line parallel to the radiation axis of said light and the cylindrical surface such that an aperture is formed between the shield and the cylindrical surface. The shield is aligned such that, of the light passing across the arc of the coated cylindrical surface, i.e., the second portion of light, a first part is intercepted by said shield and a second part passes through the aperture. A fraction of this latter part of light, i.e., that light passing through the aperture, which fraction varies with the thickness of the coating material on the cylindrical surface, is subsequently measured.

The apparatus of this invention is unique in that the amount of measured light relates to the amount of the coating material on the cylindrical surface. As such, the apparatus of this invention provides an economical means for effectively determining the amounts of a coating material on a substrate. Moreover, small and/or instantaneous changes in said amounts are immediately detected by the apparatus disclosed herein.

The apparatus of the present invention is useful in carpet manufacture, printing processes, and like operations for determining and monitoring the amount of a coating material on an applicator or similar type roll. Moreover, when two or more such apparatuses are employed in proper relationship to one another, the exact amounts of a coating transferred from a rotating cylindrical surface, e.g., an applicator roll, to a moving strip of carpet, paper or the like, can be readily determined. Furthermore, such apparatus can be employed to determine the uniformity of a coating material on a cylindrical surface.

BRIEF DESCRIPTION OF THE DRAWINGS

Understanding of this invention will be facilitated by referring to the accompanying drawings, in which.

DETAILED DESCRIPTION OF THE PREFERRED EMBODIMENTS

Figure 1:
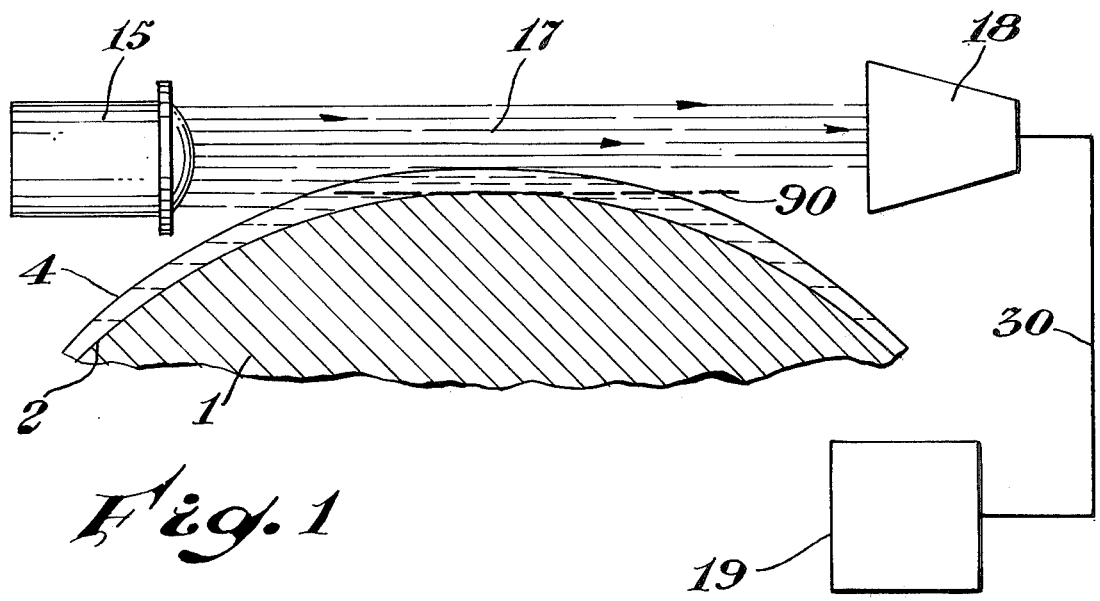
FIG. 1 is a cross-sectional schematic representation of an embodiment of this invention.

Referring now more particularly to the drawings, FIG. 1, which represents an embodiment of this invention, depicts a portion of a cylinder 1 having a cylindrical surface 2. Deposited on surface 2 is a film 4 of a coating material. A light source 15 is capable of emitting a beam of light 17, preferably a collimated beam of light across an arc of surface 2 in a direction which is not parallel to the axis of cylinder 1. Advantageously, the direction of the light, i.e., the direction of light propagation, is such that the angle between the direction of light propagation and the axis of cylinder 1 is advantageously greater than about 45°, preferably greater than about 60°. Most preferably, the direction of light propagation is essentially perpendicular to the axis of cylinder 1, i.e., said angle is greater than about 80°. Light source 15 is positioned such that a first portion of light 17 is intercepted by film 4 of the coating material. A second portion of light 17 passes across an arc of the coated cylindrical surface, i.e., is not intercepted (absorbed or reflected) by film 4. Preferably, as depicted in the illustrated embodiment, the first portion of light 17 extends to a tangent line 90 formed between the cylindrical surface 2 and a line parallel to the radiation axis of light 17. Less preferably, light 17 does not extend to said tangent line, in which case, the distance between said tangent line and the point of light 17 closest thereto is advantageously established with a high degree of precision. Detector means 18 is positioned on the opposite side of the arc of surface 2 such that a fraction (which fraction varies with the thickness of film 4 on surface 2) of the second portion of light 17, i.e., that portion which passes across an arc of the coated cylindrical surface, falls thereon. In a normal operation, the majority of the second portion of light 17 falls upon detector means 18.

In the illustrated embodiment, detector means 18 is connected to recorder means 19 by lead 30.

In operation, light source 15 emits a beam of light 17 across the coated surface, i.e., surface 2, having film 4 of the coating material deposited thereon. The first portion of said beam is intercepted by film 4 on cylindrical surface 2. The second portion of said beam passes across an arc of the coated cylindrical surface. A fraction of this second portion falls upon (strikes) detector means 18 which converts the collected light into a measurable signal, e.g., an electrical current, said measurable signal varying with the amount of light collected thereby. This signal is registered by recorder means 19.

As the coating material on surface 2 reduces the light source which passes across the arc of the coated cylindrical surface by an amount relative to its thickness on the surface, the amount of light striking detector means 18 and the signal provided thereby, i.e., output signal, relates to the amount of the coating material on surface 2. Analysis of said signal determines the thickness of film 4 of the coating material. Such analysis generally comprises (1) comparing the output signal to a reference signal, advantageously the signal provided by a cylindrical surface having no material deposited thereon, and (2) relating the difference thereof to the thickness of the material on the cylindrical surface.

In a preferred embodiment, an adjustable shield is incorporated in the apparatus and method of this invention to provide greater accuracy and reproducibility thereto. Such preferred embodiment is represented schematically by FIGS. 2 and 3 which depict a carpet backsizing operation wherein a carpet material 21 passes across the top of a cylindrical roll 10 rotating through a reservoir 11 which contains a liquid coating composition 12. As roll 10 rotates through reservoir 11, a film 13 of the coating composition forms on surface 7 of roll 10, with the thickness of film 13 being restricted by doctor blade 24. A portion of film 4 is transferred from roll 10 to the carpet material 21 when carpet 21 passes across the top of roll 10. A light source 15, adjustable shield 16 and detector means 18 is employed to determine the amount, i.e., thickness, of film 13 on surface 7 of roll 10.

Adjustable shield 16 is spaced apart from surface 7 of roll 10 at a known distance from a tangent line 8 formed between the cylindrical surface 7 and a line parallel to the radiation axis of light 17 such that an aperture is formed between shield 16 and surface 7. Preferably, this distance between tangent line 8 and the lowest extremity of shield 16 is established with a high degree of precision. In addition, although such is not critical, adjustable shield 16 is preferably of a configuration and positioned such that the amount of light passing through aperture 20 is directly related to the thickness of film 13 in an essentially linear manner, i.e., in the first degree. As such, the aperture defined by the adjustable shield and the cylindrical surface advantageously comprises a generally rectangular opening for the passage of light therethrough, e.g., the shield illustrated in FIG. 4 which is hereinafter described.

Light source 15 is capable of emitting a beam of light 17 across an arc of roll 10 in a direction which is not parallel to the axis of cylindrical roll 10. Light source 15 is positioned such that of the light 17 emitted therefrom, a first portion is intercepted by film 13 and a second portion passes an arc of the coated cylindrical surface. Preferably, said first portion extends to a tangent line 8 formed between surface 7 of roll 10 and a line parallel to the radiation axis of light 17. Of the second portion, a first part is intercepted by shield 16 and a second part passes through aperture 20. Detector means 18 is positioned on the opposite side of adjustable shield 16 such that at least a fraction, which fraction varies with the thickness of film 13 on surface 7, preferably essentially all, of light 17 passing through aperture 20 from light source 15 falls thereon. Detector means 18 is connected to recording means 19 by lead 30.

In operation, light source 15 emits a beam of light 17 across the coated substrate, i.e., roll 10 having film 13 thereon. The first portion of said light 17 is intercepted by film 13 of the coating composition. Of the second portion, a first part is intercepted by shield 16 and a second part is transmitted through aperture 20 formed between shield 16 and film 13. A fraction of said transmitted light which fraction varies with the thickness of film 13 strikes detector means 18. Detector means 18 provides a measurable signal, e.g., electrical current, which varies with the amount of light falling thereon. The signal is registered by recorder 19.

The amount of light striking detector means 18 and the signal provided thereby, i.e., output signal, relates to the thickness of film 13 on roll 10. Analysis of said signal by methods herein described determines the thickness of film 13 on roll 10.

Figure 2:
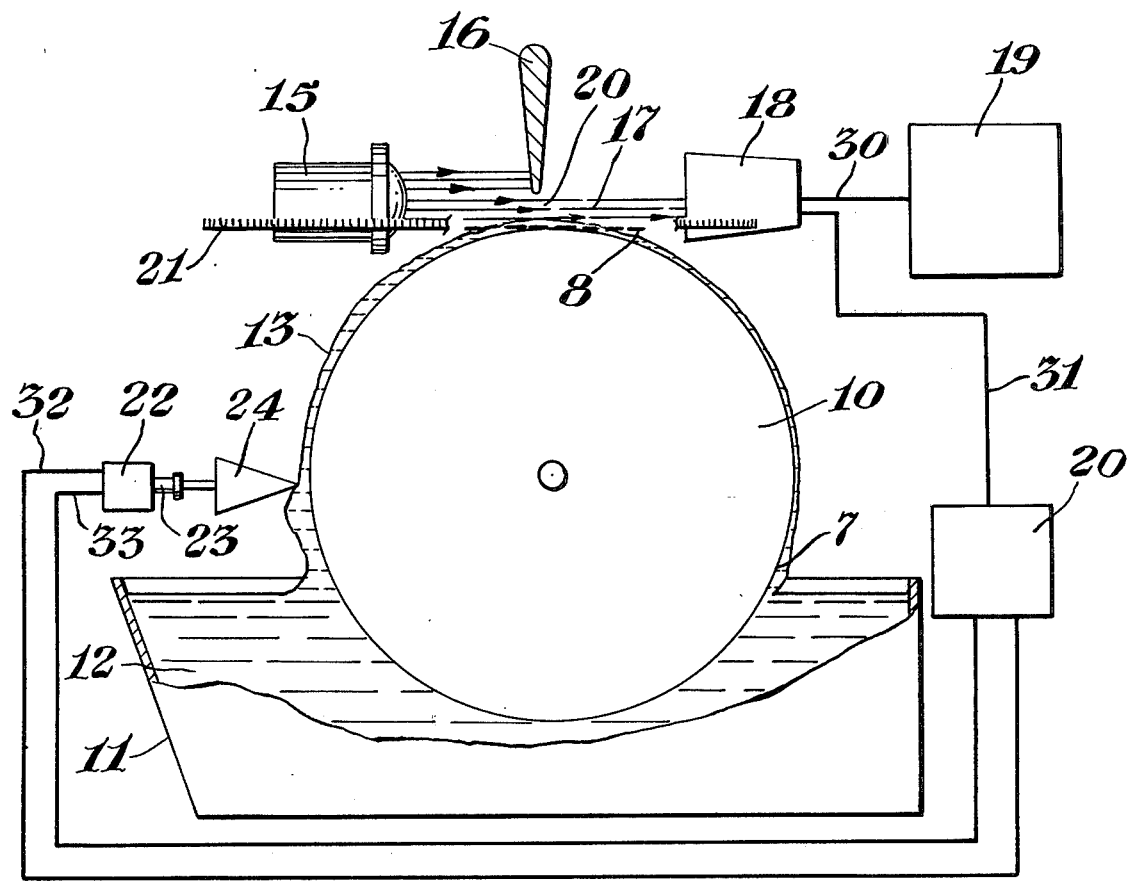
FIG. 2 is a side-view schematic representation, partly in cross-section, of a portion of a carpet backsizing operation wherein the apparatus of this invention is employed for (1) determining the amount of the backsizing composition on an applicator roll and optionally (2) controlling said amounts.
Figure 3:
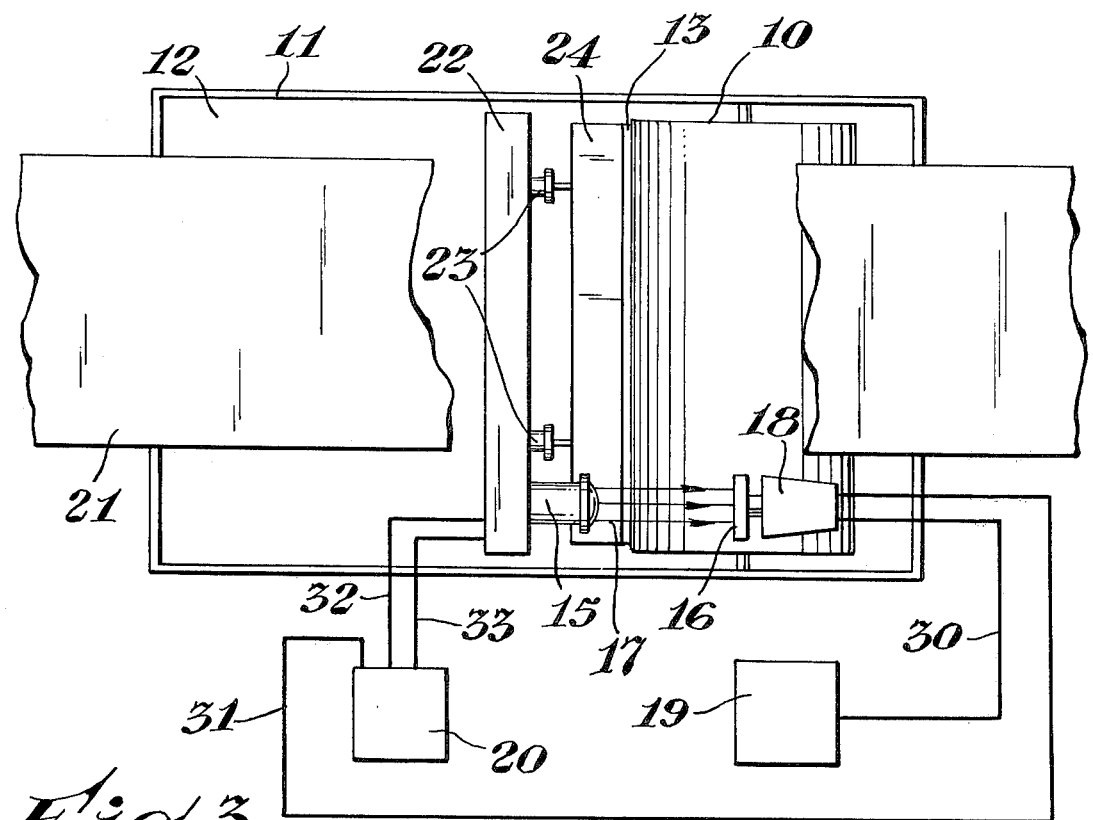
FIG. 3 is a schematic top-view representation of the carpet backsizing operation illustrated in FIG. 2.

Alternatively (or additionally), as illustrated in FIGS. 2 and 3, detector means 18 can be connected to a controller unit, in which case the thickness of film 13 can be immediately and automatically controlled. Such controller unit comprises a computing means 20 connected by lead 31 to detector means 18, and to drive means 22 by feedback lead 32 and control lead 33. Drive means 22 is operatively associated with doctor blade 24 by a doctor blade positioning means 23.

In operation, the measurable signal provided by detector means 18 is transmitted through lead 31 to computing means 20. Upon receipt of said signal, computing means 20 compares the desired film thickness to the measurable signal relating to the thickness of film 13. Based on this comparison, computing means 20 supplies a measurable signal which varies with the changes desired in the relative position of doctor blade 24. On the basis of said signal, drive means 22 (by means of positioning means 23) changes the relative position of doctor blade 24 to roll 10 such that a film 13 of desired thickness is obtained.

Figure 4:
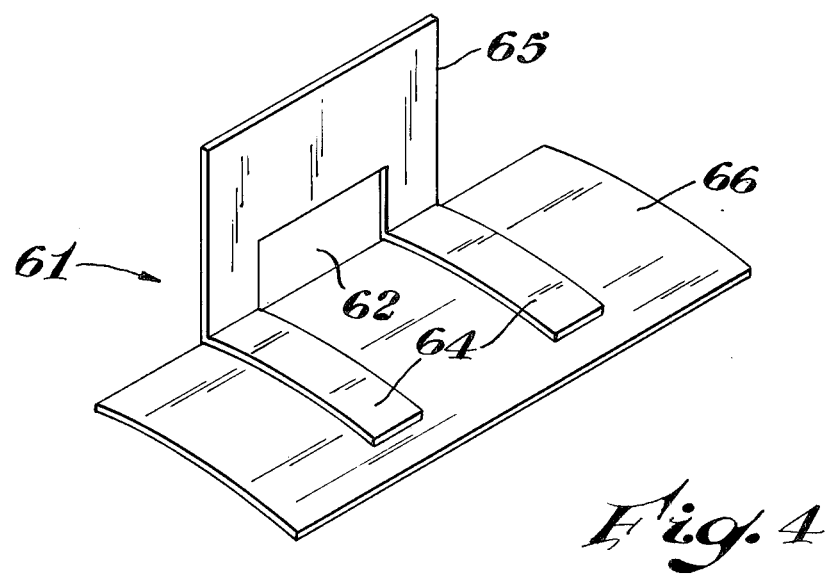
FIG. 4 is a schematic isometric representation of an adjustable shield advantageously employed in this invention.

FIG. 4 depicts an adjustable shield 61 which has been found to be particularly advantageous in the practice of this invention. Adjustable shield 61 comprises an opaque sheet member 65 having branch members 64 extending therefrom with a curvature approximate to that of the cylindrical surface 66. Shield 61 in combination with cylindrical surface 66 defines an aperture 62 of a generally rectangular shape for the passage of light therethrough. Other similar shields which in combination with the cylindrical surface form a generally rectangular opening are also advantageously employed in this invention.

Figure 5:
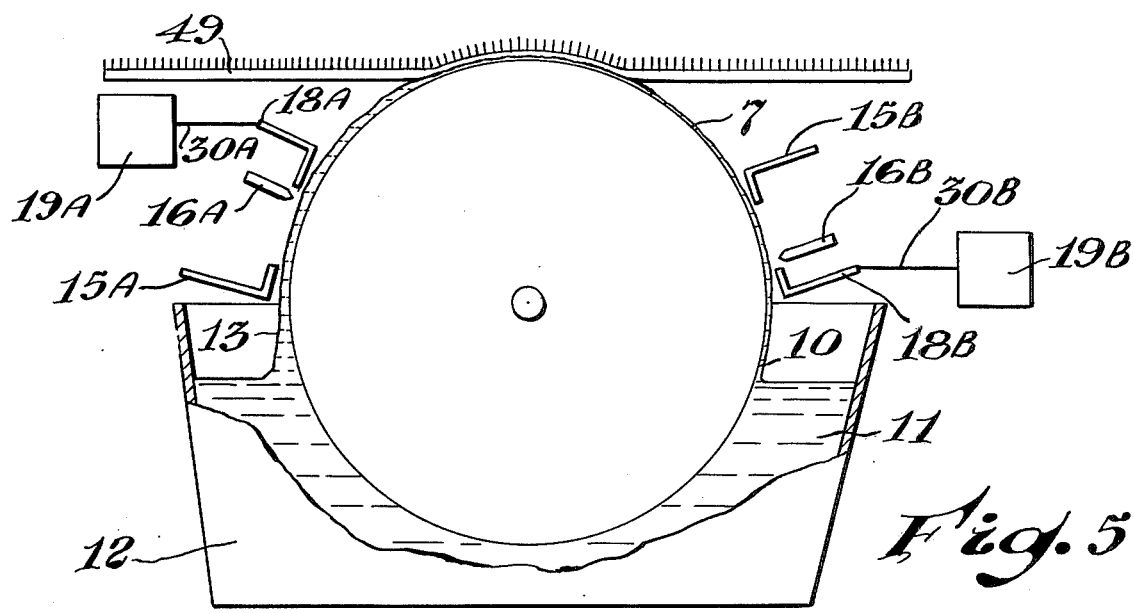
FIG. 5 is a schematic representation, partly in cross-section, of an embodiment of the present invention wherein the exact amounts of a coating material transferred from an applicator roll to a movable strip are determined.

FIG. 5 depicts a rotating cylindrical surface such as applicator roll 10 rotating in reservoir 11 containing a coating composition 12. A film 13 of the coating composition forms on surface 7 of roll 10 as it rotates through reservoir 11. A sheet of material 49, e.g., a carpet material, passes across the top of roll 10 and a portion of film 13 is transferred therefrom to sheet 49. The exact amounts of the coating composition, i.e., coating material, transferred to sheet 49 are determined by measuring the thickness of film 13, i.e., the amounts of the coating composition, on surface 7 of roll 10 prior to its contact with sheet 49 and after said contact. In such measurement, a first implement (positioned directly below sheet 49 and above the liquid level of composition 12 in reservoir 11) comprised of light source 15A, detector 18A, and optionally adjustable shield 16A, is employed to measure the thickness of film 13 prior to its contact with sheet 49 by the methods herein described. Similarly, a second implement, (positioned diametrically opposite apparatus 14A) comprised of a light source 15B, detector 18B, and optionally adjustable shield 16B, is employed to measure the thickness of film 13 after said contact. In the illustrated embodiment, as the space provided for light sources 15A and 15B and detectors 18A and 18B is generally small, fiber optical type equipment such as those described in Bulletin 725 of Dolan-Jenner Industries, Inc., entitled Microscope Illuminators and Fiber Optics; or a mirrored arrangement is advantageously employed. The measurable signals provided by detectors 18A and 18B are received by recorders 19A and 19B, respectively, by means of leads 30A and 30B and recorded thereon. Analysis of said signals by methods herein described, determines the thickness of film 13 on roll 10 both before and after the contact of film 13 with sheet 49. Comparison of said thicknesses determines the amounts of said material transferred to sheet 49.

Figure 6:
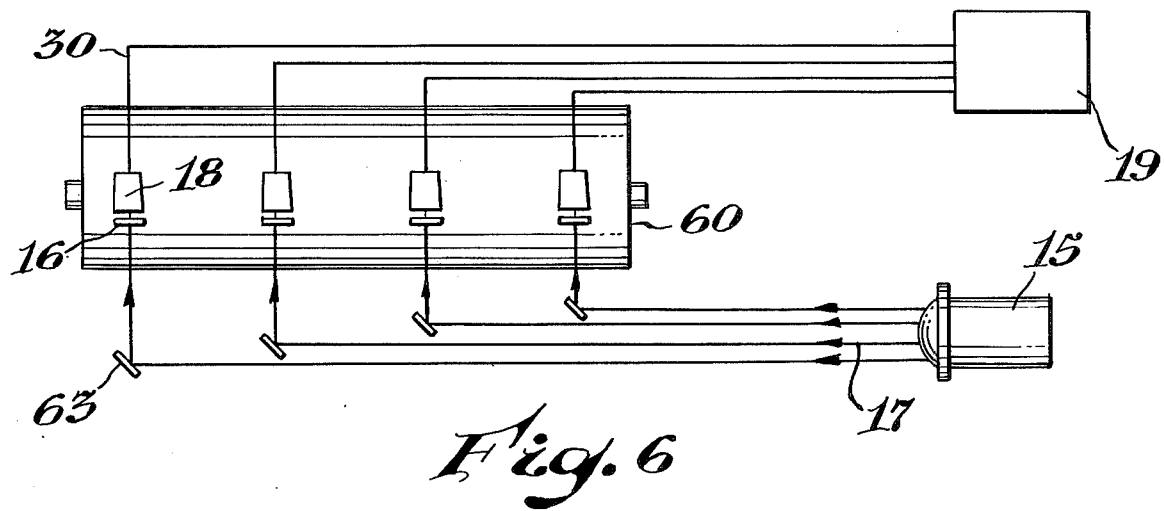
FIG. 6 is a schematic representation of an embodiment of this invention wherein the uniformity of a coating material on a cylindrical surface is determined.

In FIG. 6, the thickness of a film of coating material is determined at various points across a cylinder 60 in accordance with this invention, and, as such, the uniformity of the film on the surface of cylinder 60 is measured. In such determination, a light source 15 emits a beam of light 17 passing across cylinder 60 in a first direction which is advantageously essentially parallel to the axis of cylinder 60. A segment of light 17, preferably a segment of equal amounts, is reflected by each of a series of reflectors 63, e.g., mirrors, such that the light segment reflected by each reflector propagates, i.e., travels, in a second direction which is not parallel to the axis of the cylinder 60. Preferably, said propagation is in a direction which is essentially perpendicular to the first direction. A first portion of each reflected light segment is intercepted by the coating material on cylinder 60 and a second portion passes across an arc of the coated surface of cylinder 60. Preferably, each light segment extends to a tangent line formed between the surface of cylinder 60 and a line parallel to the radiation axis of the light segment.

A series of detectors 18 are positioned such that at least a fraction of each light segment, preferably essentially all of each light segment passing across the arc of the coated cylinder strikes the detector. Each detector converts this light into a measurable signal which is transmitted to a recorder 19 by means of a series of leads 30. Recorder 19 registers each signal or, alternatively, an average of said signals.

Optionally, as depicted in the illustrated embodiment, a series of adjustable shields 16 (or alternatively a single shield of sufficient length) are spaced apart from the surface of cylinder 60 at a known distance from the tangent line to define an aperture between each of the shields 16 and cylinder 60. In such case, a first part of each light segment is advantageously intercepted by one of the shields 16 and a second part passes through the aperture formed between one of the shields 16 and cylinder 60. A fraction of this second part of each light segment strikes one of the detectors 18.

In the operation of the illustrated embodiment, the coating material on cylinder 60 reduces the light passing through each aperture by an amount relative to its thickness on the cylinder. As such, analysis of the signals provided by detectors 18 determines the thickness of the material at various points across cylinders 60 or, alternatively, an average of said thicknesses. In the latter case, a single detector is advantageously employed.

Figure 7:
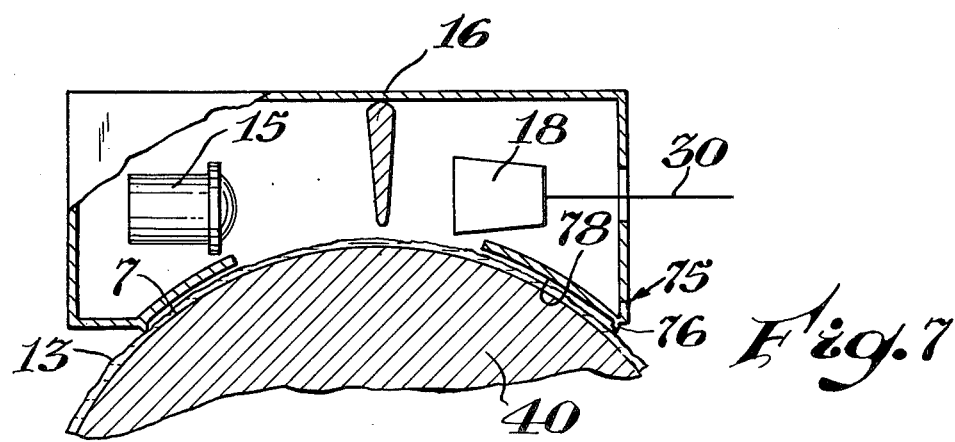
FIG. 7 is a fragmentary view, partially in cross-section, schematic representation of an embodiment of this invention wherein the apparatus of this invention is enclosed within a housing which reduces the effects of environmental light.

FIG. 7 depicts a portion of cylinder 40 having deposited thereon a film 13 of a coating material. A light source 15, adjustable shield 16 and detector 18, is employed to measure the thickness of film 13 by the methods hereinbefore described. Lead 30 connects detector 18 to a suitable control unit, recorder or the like (not shown). Light source 15, adjustable shield 16 and detector 18 are contained within a housing 75, which reduces the effects of environmental light in the operation of the apparatus of this invention. Said housing is advantageously constructed of a highly light absorbent material. Housing 75 comprises flange-like members 76 spaced apart from cylinder 40 by a distance less than or equal to the closest distance between adjustable shield 16 and surface 7 of cylinder 40. Flanges 76 insure the adjustable shield 16 is maintained free of any buildup due to the transfer of material from roll 10 thereto. Protuberances 78 of housing 75 which extend from flange members 76 toward adjustable shield 16, conform generally to the curvature of the surface of cylinder 40 and are spaced apart therefrom such that they do not contact film 13 during operation. In such manner, the influence of environmental light on the apparatus of this invention is reduced.

With regard to the various components useful in this invention, the light source is advantageously a source which emits a beam of light, preferably collimated, of constant intensity in a broad band or selected narrow band of frequencies. By "light" it is meant electromagnetic radiation of a suitable frequency. It may be a conventional incandescent source, such as a tungsten filament or a solid state light emitting source, such as a light emitting diode or a laser. Advantageously, the frequency of said light is in the visible or near infrared spectrum and is essentially monochromatic, i.e., essentially of one wave length. Advantageously, the light source is a high intensity light source, e.g., a quartz-halogen light from about 100 to about 500 watts, such that the influence of environmental light is reduced. Moreover, when the adjustable shield is not employed, the light source is advantageously one whose light generates a well defined cross-sectional area, preferably being a rectangular or square cross-section.

The adjustable shield is advantageously constructed of a normally opaque material which is preferably highly light absorbent. As mentioned, the size and shape of the shield is not particularly critical, although the aperture formed between the shield and the cylindrical surface is preferably such that the light passing therethrough relates to the thickness of the film on the cylindrical surface in an essentially linear manner, e.g., the aperture is of a generally rectangular shape.

The detector is advantageously a device which receives and measures at least a fraction of the light from the light source which is not intercepted by the coating material, i.e., that light which passes across an arc of the coated cylindrical surface. Devices conventionally employed as light detectors, e.g., photometers and the like, are useful in the practice of this invention. Typically, such detectors consist of an electrical circuit containing a conductor element, the conductivity of which element varies in response to light. Advantageously, the detectors used in this invention are sensitive to small quantities of light. Moreover, such detector beneficially has a very fast response due to the fact that the surfaces being illuminated are often moving at significant speed. For example, in the application of a coating composition to a carpet backing, an applicator roll having a diameter of 25-30 cms can move at speeds from about 100 to about 150 rpm. Furthermore, the "noise" generated within the detector, including any amplification of the signal provided therefrom, should be some minimal amount. In operation, the detector will be subjected to some light not returned by the surface, i.e., environmental light. As such, the detector should be more sensitive to some light wave lengths than others. Hence, it is desirable to match the light source and detector. For example, a shield IP28 photomultiplier sold by RCA coupled with a Keithley 602 electrometer sold by Keithley Instruments, Inc., has been found to be advantageously employed with a Bausch and Lomb microscope light source, Catalog No. 31-33-53 and other types of incandescent light. Other detectors, amplifiers and light sources can be readily selected by those in the art.

The relative placement of the detector is not particularly critical, provided the light source and the detector are maintained in a constant position throughout the operation, i.e., determination of the reference signal and subsequent measurements employing said reference signal. Such position is advantageously a position such that the maximum amount of light passing through the aperture is collected.

As an example of such position, the thickness of a binder composition for carpet coating applications based on a carboxylated styrene-butadiene latex sold by The Dow Chemical Company as DL-892 is effectively measured when deposited on a 5.7 cm diameter applicator roll rotating in a reservoir of said binder at a speed of 5 rpm by a constant intensity light source placed about 30 cm from the detector means, with an adjustable shield positioned equidistant from the light source and detector and 0.25 cm from the tangent line of the roll and a line parallel to the radiation axis of light. In said measurement, a doctor blade is positioned from about 0.25 mm to about 0.80 mm from the applicator roll.

In the normal practice of this invention, the electrical or other measurable signal produced by the detector, which may or may not be amplified, can be recorded by some suitable recording means, e.g., recording chart or display screen. This signal relates to the thickness of the material on the substrate and analysis of this signal determines the thickness of the coating on the substrate. Typically, an electrical circuit means connected to the detector (or alternatively the recorder) is employed for such analysis.

As used herein, the term "cylindrical surface" refers to any non-planar surface of a cylinder, including circular, elliptic, hyperbolic, parabolic or similar type cylinders which surface is constructed of a normally solid substance, advantageously a substance which is generally impervious to the coating material applied thereto. Representative examples of such substances include metals such as aluminum; zinc; copper or steel; glass and glass substitutes; plastics such as polystyrene, polyurethane, acrylic polymers; phenolic resins, polyethylene and epoxy resins; tile and the like. This invention is particularly advantageous for a substrate having a cylindrical surface having a circular cross-section, e.g., applicator roll.

The term "coating material" is used herein to mean any material which can be deposited on one or more of the cylindrical surfaces herein described. Typically, such coating materials are normally liquid materials including solutions, emulsions, dispersions, slurries or combinations thereof which upon drying become normally solid. Representative examples include latex compositions, e.g., formulated compositions of a natural or synthetic latex, such as paints, carpet backsizing compositions, or the like; inks; and the like. Moreover, the apparatus of this invention is also suitable for determining the amount of normally solid materials, e.g., metals, on a cylindrical surface.

What is claimed is:

1. In a coating apparatus, means for measuring the amount of coating material on an applicator roll, comprising:
   a. an applicator roll associated with a source of said material;
   b. shield means spaced from the roll surface;
   c. a light source capable of emitting a beam of light in a direction which is not parallel to the axis of the cylindrical surface, said light source being positioned such that when the coating material is deposited on the cylindrical surface, a first portion of the light emitted therefrom is intercepted by the coating material deposited on the cylindrical surface and a second portion passes across an arc of the coated cylindrical surface, said shield being aligned such that a first part of the second portion of light is intercepted thereby and a second part of the second portion of light passes through the aperture formed by said shield and roll surface; and
   d. a detector means capable of measuring at least a fraction of the amount of said second part of light, the amount of said fraction varying with the thickness of the coating material when same is deposited on the cylindrical surface.

2. The apparatus of claim 1 wherein the first portion of light extends to a tangent line formed between the cylindrical surface and a line parallel to the radiation axis of the beam of light.

3. The apparatus of claim 1 or 2 wherein the direction of light propagation is essentially perpendicular to the axis of the cylindrical surface.

4. The apparatus of claim 1 or 2 wherein the detector means provides a measurable signal, said signal varying with the amount of light which strikes the detector.

5. The apparatus of claim 3 further comprising a recorder means for registering the measurable signal provided by the detector means.

6. The apparatus of claim 1 wherein the light source and detector means are contained within a housing which reduces the effects of environmental light.

7. The apparatus of claim 6 wherein the housing has flange members spaced apart from the cylindrical surface by a distance less than or equal to the distance between the cylindrical surface and the point of the adjustable shield closest thereto and protuberances extending from said flange members toward the shield, said protuberances conforming generally to the curvature of the cylindrical surface and spaced apart therefrom by a sufficient distance such that the protuberances do not contact the coating material when same is deposited on the cylindrical surface.

8. The apparatus of claim 3 wherein the aperture defined by the adjustable shield and the cylindrical surface constitutes a generally rectangular opening for the passage of light therethrough.

9. In a coating apparatus, means for measuring the amount of coating material at a plurality of points across a coating roll, comprising:
   a. an applicator roll associated with a source means of said material;
   b. shield means spaced from the roll surface and associated therewith at each said point;
   c. a light source for emitting a beam of light in a first direction essentially parallel to the axis of the cylindrical surface;
   d. a series of reflectors, each reflector being capable of reflecting a segment of the light in a second direction which is not parallel to the axis of the cylindrical surface and such that when the coating material is deposited on the cylindrical surface a first portion of each segment of reflected light is intercepted by the coating material deposited on the cylindrical surface and a second portion of each segment of reflected light passes across an arc of the coated cylindrical surface, said shield being aligned such that a first part of each said second portion of light is intercepted thereby and a second part of each said second portion of light passes through the aperture formed by a said shield and roll surface at each said point; and
   e. a series of detector means, each detector means being capable of measuring at least a fraction of the amount of a said second part of one said segment of reflected light, the amount of each of the light fractions varying with the thickness of the coating material when same is deposited on the cylindrical surface.

10. The apparatus of claim 9 wherein the first portion of each reflected light segment extends to a tangent line formed between the cylindrical surface and a line parallel to the corresponding radiation axis of each of the reflected light segments.

11. The apparatus of claim 10 wherein said detector means are adapted to measure the average of the coating thicknesses at said points.

12. The apparatus of claim 11 wherein each detector means generates a measurable signal, said signal varying with the amount of light which strikes the detector means.

13. The apparatus of claim 12 further comprising a recorder means for registering the signals generated by the detector means.

14. A device for determining the amount of a coating material on a rotating cylindrical surface which is transferred to a sheet passing over said surface; said device comprising a cylindrical surface capable of receiving the coating material thereon and a first and second implement, each implement having:
   a. shield means having a side thereof spaced from the cylinder surface;
   b. a light source capable of emitting a beam of light in a direction which is not parallel to the axis of the cylindrical surface and being positioned such that when the coating material is deposited on the cylindrical surface, a first portion of the light emitted from each light source is intercepted by the coating material and a second portion passes across an arc of the coated cylindrical surface, said shield being aligned such that a first part of the second portion of light is intercepted thereby and a second part of said second portion of light passes through the aperture formed by said shield and cylinder surface; and c. a detector means capable of measuring at least a fraction of the amount of said second part of light, the amount of said fraction varying with the thickness of the coating material on the cylindrical surface when the coating material is deposited thereon;

said first implement being positioned such that it is capable of measuring the amount of the coating material on the cylindrical surface prior to its contact with the sheet, and the second implement being positioned such that it is capable of measuring the amount of the coating material on the surface after said contact.

15. The device of claim 14 wherein the first portion of the beam of light of both the first and second implement extends to a tangent line formed between a line parallel to the corresponding radiation axis of each beam of light and the cylindrical surface.

* * * * *